(12) United States Patent
Lee et al.

(10) Patent No.: US 11,858,522 B2
(45) Date of Patent: Jan. 2, 2024

(54) DEVICE AND METHOD FOR DETECTING FAILURE OF ACTUATOR OF VEHICLE

(71) Applicants: HYUNDAI MOTOR COMPANY, Seoul (KR); Kia Corporation, Seoul (KR)

(72) Inventors: Sang Hyu Lee, Incheon (KR); Ki Beom Lee, Hwaseong-si (KR); Joo Han Nam, Hwaseong-si (KR); Jong Su Lim, Hwaseong-si (KR); Hyun Jae Bang, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 99 days.

(21) Appl. No.: 17/393,639

(22) Filed: Aug. 4, 2021

(65) Prior Publication Data

US 2022/0063641 A1 Mar. 3, 2022

(30) Foreign Application Priority Data

Aug. 27, 2020 (KR) .................. 10-2020-0108517

(51) Int. Cl.
*B60W 50/02* (2012.01)
*B60W 50/029* (2012.01)
*G06N 3/045* (2023.01)

(52) U.S. Cl.
CPC ...... *B60W 50/0205* (2013.01); *B60W 50/029* (2013.01); *G06N 3/045* (2023.01);
(Continued)

(58) Field of Classification Search
CPC ........... B60W 50/0205; B60W 50/029; B60W 2050/021; B60W 2050/022; B60W 2050/0292; B60W 2300/145; B60W 2520/105; B60W 2520/125; B60W 2520/14; B60W 2540/18; B60W 2050/0031; B60W 50/14; B60W 2050/143; B60W 2300/152; B60W 2520/10; B60W 2520/22; B60W 50/023; B60W 60/0015;
(Continued)

(56) References Cited

U.S. PATENT DOCUMENTS 5,710,565 A * 1/1998 Shirai .................... G05D 1/024
342/72
10,737,717 B2 * 8/2020 Peng ....................... G01S 19/45
(Continued)

FOREIGN PATENT DOCUMENTS

CN      113156913 A  * 7/2021
CN      114002597 A  * 2/2022
WO      WO-2019137913 A1 * 7/2019

OTHER PUBLICATIONS

CN-113156913-A translation (Year: 2021).*
CN-114002597-A translation (Year: 2022).*

*Primary Examiner* — Jeff A Burke
*Assistant Examiner* — Kyle T Johnson
(74) *Attorney, Agent, or Firm* — MORGAN, LEWIS & BOCKIUS LLP

(57) ABSTRACT

A device for detecting a failure of an actuator of a vehicle includes: a training device that trains a model using training data comprising behavior data of the vehicle and a steering compensation angle, and a controller that detects the failure of the actuator in the vehicle based on the model.

14 Claims, 6 Drawing Sheets

(52) U.S. Cl.
CPC . *B60W 2050/021* (2013.01); *B60W 2050/022* (2013.01); *B60W 2050/0292* (2013.01); *B60W 2300/145* (2013.01); *B60W 2520/105* (2013.01); *B60W 2520/125* (2013.01); *B60W 2520/14* (2013.01); *B60W 2540/18* (2013.01)

(58) Field of Classification Search
CPC .......... B60Y 2200/221; B60Y 2306/15; G06N 3/0454; G06N 3/0445; G06N 3/08; G05B 23/0243; G05B 2219/24065; G01M 13/02; G01M 17/06; G01P 11/00
See application file for complete search history.

(56) References Cited

U.S. PATENT DOCUMENTS

| | | | |
|---|---|---|---|
| 2008/0015751 A1* | 1/2008 | Riepold | B60G 17/0195 701/41 |
| 2013/0253767 A1* | 9/2013 | Lee | B60W 50/04 701/41 |
| 2019/0256064 A1* | 8/2019 | Hecker | B60W 30/00 |
| 2019/0325290 A1* | 10/2019 | Tong | B62D 15/021 |
| 2019/0344799 A1* | 11/2019 | Tiwari | B60W 60/0015 |
| 2020/0110401 A1* | 4/2020 | Cella | G05B 23/0294 |
| 2020/0262263 A1* | 8/2020 | Doerksen | B60K 7/0007 |
| 2021/0269029 A1* | 9/2021 | Fendt | G05D 1/0295 |
| 2021/0380099 A1* | 12/2021 | Lee | G08G 1/167 |
| 2022/0017141 A1* | 1/2022 | Maruyama | B62D 5/0484 |

\* cited by examiner

DEVICE AND METHOD FOR DETECTING FAILURE OF ACTUATOR OF VEHICLE

CROSS-REFERENCE TO RELATED APPLICATION

This application claims the benefit of priority to Korean Patent Application No. 10-2020-0108517, filed in the Korean Intellectual Property Office on Aug. 27, 2020, the entire contents of which are incorporated herein by reference.

TECHNICAL FIELD

The present disclosure relates to a technology for detecting a failure of an actuator in a vehicle based on deep learning.

BACKGROUND

In general, deep learning (or a deep neural network) is a type of machine learning, which has several layers of an artificial neural network (ANN) between an input and an output. Such an artificial neural network may include a convolution neural network (CNN), a recurrent neural network (RNN), and the like depending on a structure, a problem to be solved, a purpose, and the like.

Data input to the convolution neural network is divided into a training set and a test set. The convolution neural network learns a weight of the neural network through the training set, and identifies the learned result through the test set.

In such a convolution neural network, when the data is input, an operation proceeds step by step from an input layer to a hidden layer and the result of the operation is output. In this process, the input data passes through all nodes only once.

The fact that the input data passes through all the nodes only once as such means that a structure of the convolution neural network does not consider an order, that is, a temporal aspect of the data. In the end, the convolution neural network performs learning regardless of the temporal order of the input data. On the other hand, the recurrent neural network has a structure in which a result of the hidden layer is input to the hidden layer again. Such structure means that the temporal order of the input data is considered.

In a case of a tractor trailer, a conventional technology of detecting a failure of an actuator in a vehicle detected the failure of the actuator in the vehicle through Kalman filter-based prediction of a loaded capacity and a center of gravity of a cargo, a gradient, a bank, and a curvature of a road surface, and a behavior of the trailer. Therefore, the conventional technology has a problem of not being able to detect whether the actuator in the vehicle has failed with high accuracy because of complexity of controlling the vehicle.

The matters described in this background are written to enhance an understanding of the background of the disclosure, and may include matters other than the prior art already known to those of ordinary skill in the field to which this technology belongs.

SUMMARY

The present disclosure has been made to solve the above-mentioned problems occurring in the prior art while advantages achieved by the prior art are maintained intact.

An aspect of the present disclosure provides a device and a method for detecting a failure of an actuator of a vehicle that may detect a failure of each actuator in the vehicle rapidly and accurately without a complicated calculation process by training a first model using first training data composed of behavior data of the vehicle and a steering compensation angle, training a second model using second training data composed of the steering compensation angle, which is an output value of the first model, lateral data, and a failure probability value of each actuator, and determining whether each actuator has failed based on the first model and the second model.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for detecting a failure of an actuator of a vehicle includes a training device that trains a main model using training data composed of a steering compensation angle, lateral data, and a failure probability value of the actuator, and a controller that detects the failure of the actuator in the vehicle based on the main model.

In one implementation, the steering compensation angle may be an output value of a preprocessing model receiving behavior data of the vehicle and outputting the steering compensation angle.

In one implementation, the behavior data may include at least one of a steering angle of the vehicle, a speed (a longitudinal speed) of the vehicle, and/or a longitudinal acceleration of the vehicle.

In one implementation, the behavior data may further include a tractor yaw rate and a hitch angle.

In one implementation, the main model may receive the steering compensation angle and the lateral data and output the failure probability value of the actuator.

In one implementation, the lateral data may include at least one of a lateral acceleration of the vehicle and/or data on a lateral error compared to a travel route of the vehicle.

In one implementation, the actuator may include at least one of a steering actuator, a driving actuator, and/or a braking actuator.

In one implementation, the controller may alert a driver when the failure has occurred on the actuator.

In one implementation, the controller may request an autonomous vehicle to perform redundancy travel when the failure has occurred on the actuator.

According to another aspect of the present disclosure, a method for detecting a failure of an actuator of a vehicle includes training, by a training device, a main model using training data composed of a steering compensation angle, lateral data, and a failure probability value of the actuator, and detecting, by a controller, the failure of the actuator in the vehicle based on the main model.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
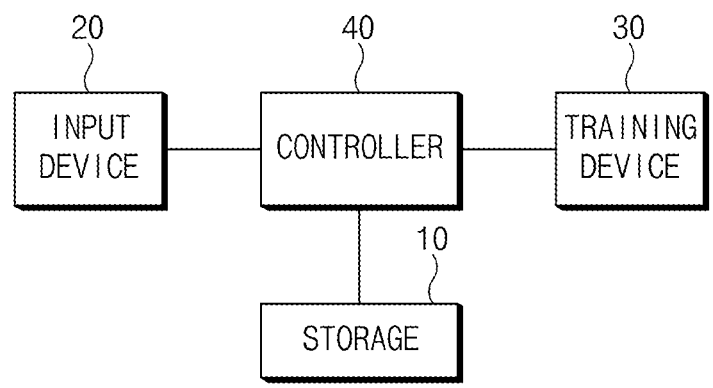
FIG. 1 is a block diagram of a device for detecting a failure of an actuator of a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a device for detecting a failure of an actuator of a vehicle according to an embodiment of the present disclosure.

As shown in FIG. 1, a device 100 for detecting a failure of an actuator of a vehicle according to an embodiment of the present disclosure may include storage 10, an input device 20, a training device 30, and a controller 40. In this connection, components may be combined with each other to be implemented as one component, or some components may be omitted based on a scheme for implementing the device 100 for detecting the failure of the actuator of the vehicle according to an embodiment of the present disclosure. In particular, the device 100 may be implemented such that a function of the training device 30 is performed by the controller 40.

Looking at each of the components, first, the storage 10 may store various required logic, algorithms, and programs required in a process of training a first model (an inference model) using first training data composed of behavior data of the vehicle and a steering compensation angle, training a second model (an inference model) using second training data composed of the steering compensation angle, which is an output value of the first model, lateral data, and a failure probability value of each actuator, and determining whether each actuator has failed based on the first model and the second model.

In general, deep learning is a process of creating a computer model to identify, e.g., faces in CCTV footage, or product defects on a production line. Inference is the process of taking that model, deploying it onto a device, which will then process incoming data (usually images or video) to look for and identify whatever it has been trained to recognize.

The storage 10 may store the first model (a pre-processing model) and the second model (a main model) whose learning has been completed by the training device 30.

Such storage 10 may include at least one type of recording media (storage media) of a memory of a flash memory type, a hard disk type, a micro type, a card type (e.g., a secure digital card (SD card) or an eXtream digital card (XD card)), and the like, and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The input device 20 may input behavior data (training data or test data) of the vehicle into a first model 31, and input lateral data (training data or test data) into a second model 32. In this connection, the behavior data of the vehicle may include a steering angle, a speed (a longitudinal speed) of the vehicle, and a longitudinal acceleration, and may further include a tractor yaw rate and a hitch angle when the vehicle is a tractor trailer. In this connection, the hitch angle means an angle between the tractor and the trailer. In addition, the lateral data may include a steering compensation angle $\delta_{affect}$, a lateral acceleration $\alpha_{lateral}$, and data lateral$_{error}$ on a lateral error compared to a travel route of the vehicle.

The training device 30 may train the first model (the inference model) using the first training data composed of the behavior data of the vehicle and the steering compensation angle, and may train the second model (the inference model) using the second training data composed of the steering compensation angle, which is the output value of the first model, the lateral data, and the failure probability value of each actuator.

The controller 40 performs overall control such that the respective components may normally perform functions thereof. Such controller 40 may be implemented in a form of hardware, software, or a combination of the hardware and the software. The controller 40 may be implemented as a microprocessor or an electronic control unit, but may not be limited thereto.

In particular, the controller 40 may control the training device 30 to train the first model 31 using the first training data composed of the behavior data of the vehicle and the steering compensation angle, and train the second model 32 using the second training data composed of the steering compensation angle, which is the output value of the first model, the lateral data, and the failure probability value of each actuator.

The controller 40 may determine whether each actuator in the vehicle has failed based on the first model 31 and the second model 32. That is, the controller 40 may detect the failure of each actuator in the vehicle.

When the failure occurs in at least one actuator in the vehicle, the controller 40 may alert a driver. In this connection, when the vehicle is an autonomous vehicle, the controller 40 may request an autonomous driving system to perform redundancy travel.

The controller 40 may acquire travel route information of the vehicle in association with a navigation system (not shown) included in the vehicle.

The controller 40 may detect the lateral error compared to the travel route of the vehicle based on information acquired from various sensors (a lidar sensor, a radar sensor, a camera, and the like) included in the vehicle. That is, the controller 40 may generate the data on the lateral error compared to the travel route of the vehicle.

The controller 40 may acquire the behavior data and the lateral data of the vehicle from the various sensors included in the vehicle.

The controller 40 may acquire the behavior data of the vehicle through a vehicle network. In this connection, the vehicle network may include a controller area network (CAN), a controller area network with flexible data-rate (CAN FD), a local interconnect network (LIN), a FlexRay, a media oriented systems transport (MOST), an Ethernet, and the like.

Figure 2:
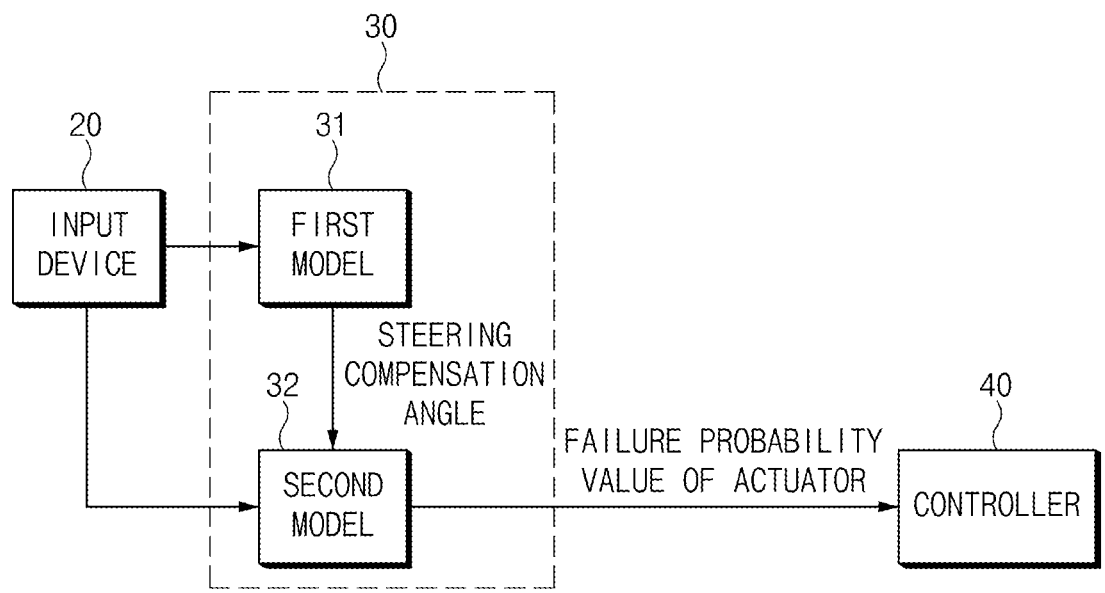
FIG. 2 is a detailed block diagram of a training device included in a device for detecting a failure of an actuator of a vehicle according to an embodiment of the present disclosure.

FIG. 2 is a detailed block diagram of a training device included in a device for detecting a failure of an actuator of a vehicle according to an embodiment of the present disclosure.

As shown in FIG. 2, the training device 30 included in the device for detecting the failure of the actuator of the vehicle according to an embodiment of the present disclosure may include the first model 31 and the second model 32.

The first model 31 may be implemented as a fully connected neural network (FCNN) as the preprocessing model, but is also able to be implemented as a convolution neural network (CNN) or a GoogleNet.

Such first model 31 is the inference model, which may perform the learning by receiving the first training data composed of the behavior data of the vehicle and the steering compensation angle corresponding thereto from the input device 20. In this connection, the first model 31 may perform the learning in a supervised learning scheme.

In addition, when the learning is completed and applied to the vehicle, the first model 31 may receive the behavior data of the vehicle from the input device 20 and output an optimal steering compensation angle.

Figure 3:
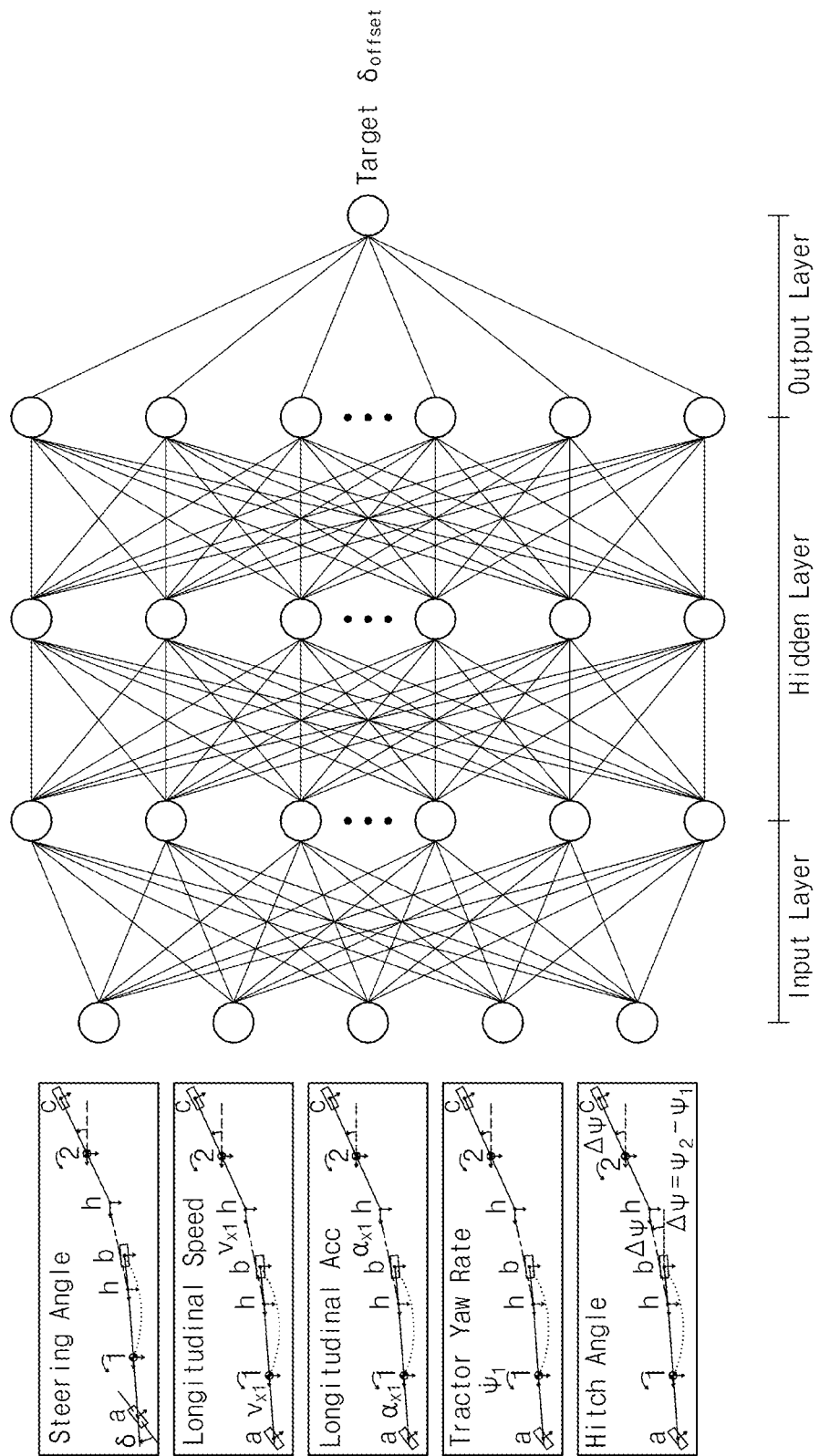
FIG. 3 is a detailed structural diagram of a first model included in a training device of a device for detecting a failure of an actuator of a vehicle according to an embodiment of the present disclosure.

For reference, because the tractor trailer has a form in which a towing vehicle (the tractor) and a towed vehicle (the trailer) are connected to each other, a change in dynamics of the towing vehicle affects the towed vehicle. Therefore, as shown in FIG. 3, the first model 31 to which all neurons are connected is suitable for analyzing dynamics elements of a target vehicle and finding a correct value.

The second model 32 may be implemented as a recurrent neural network (RNN) as the main model, but is also able to be implemented as a long short-term memory (LSTM).

Such second model 32 is the inference model, which may perform the learning based on second training data composed of the steering compensation angle, which is the output value of the first model 31, the lateral data, and the failure probability value of each actuator. In this connection, the second model 32 may perform learning in an unsupervised learning scheme.

In addition, when the learning is completed and applied to the vehicle, the second model 32 may receive the steering compensation angle, which is the output value of the first model 31, and the lateral data from the input device 20, and output the failure probability value of each actuator.

Figure 4:
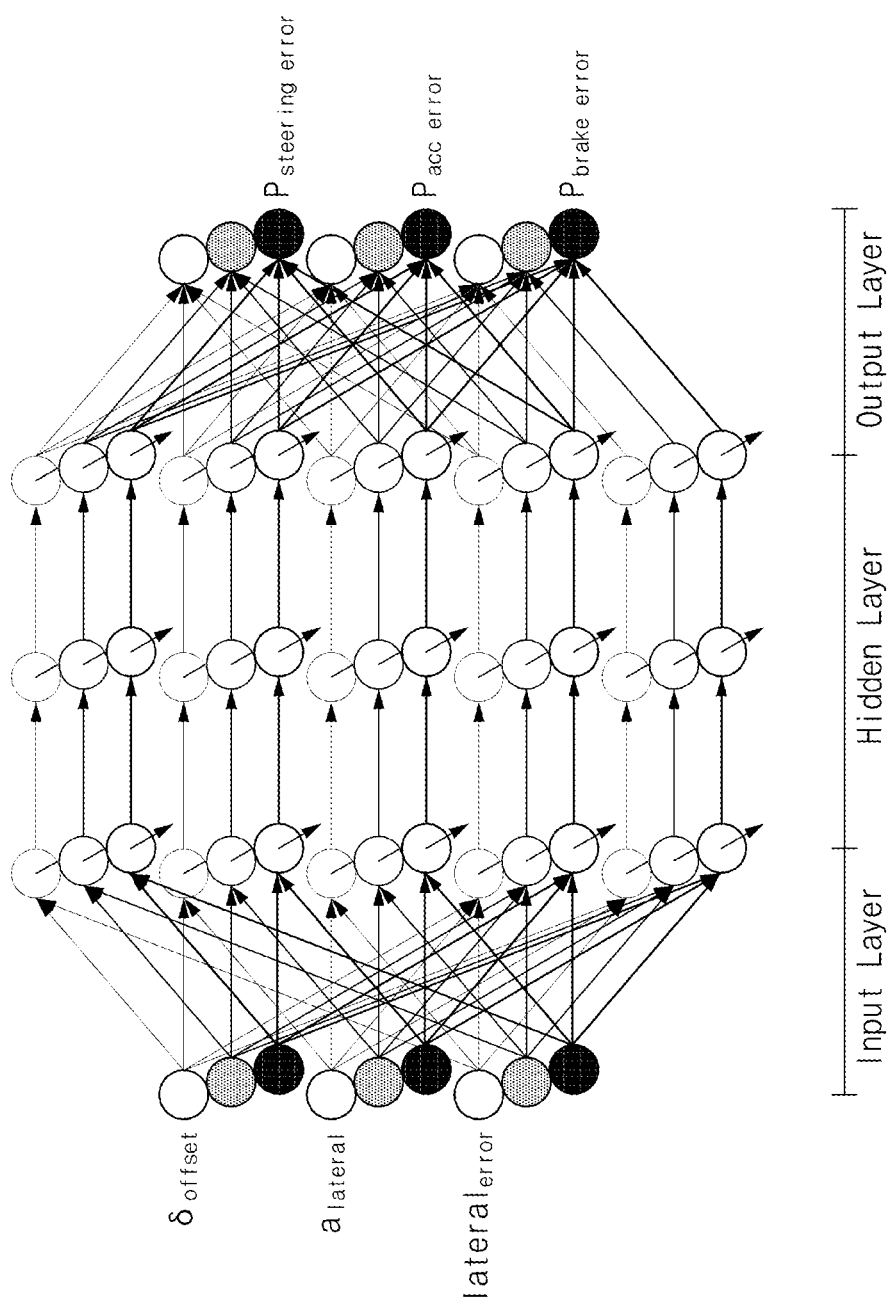
FIG. 4 is a detailed structural diagram of a second model included in a training device of a device for detecting a failure of an actuator of a vehicle according to an embodiment of the present disclosure.

For reference, because data used to detect the failure of the actuator is sequence data, the second model 32 capable of processing the sequence data as shown in FIG. 4 is suitable.

FIG. 3 is a detailed structural diagram of a first model included in a training device of a device for detecting a failure of an actuator of a vehicle according to an embodiment of the present disclosure.

As shown in FIG. 3, the first model 31 included in the training device 30 of the device for detecting the failure of the actuator of the vehicle according to an embodiment of the present disclosure may include an input layer that receives at least one of the steering angle, the speed (the longitudinal speed) of the vehicle, and the longitudinal acceleration, the tractor yaw rate, and/or the hitch angle, a hidden layer that processes a linear combination of variable values transmitted from the input layer as a nonlinear function, and an output layer that outputs the steering compensation angle $\delta_{offset}$ as the result of processing of the hidden layer.

FIG. 4 is a detailed structural diagram of a second model included in a training device of a device for detecting a failure of an actuator of a vehicle according to an embodiment of the present disclosure.

As shown in FIG. 4, the second model 32 included in the training device 30 of the device for detecting the failure of the actuator of the vehicle according to an embodiment of the present disclosure may include an input layer that receives at least one of the steering compensation angle $\delta_{offset}$, which is the output of the first model 31, the lateral acceleration $\alpha_{lateral}$ of the vehicle as the lateral data, and/or the data lateral$_{error}$ on the lateral error compared to the travel route of the vehicle, a hidden layer that processes a linear combination of variable values transmitted from the input layer as a nonlinear function, and an output layer that outputs the failure probability value of each actuator of the vehicle as the result of processing of the hidden layer.

In FIG. 4, each actuator may include at least one of a failure probability value $P_{steering\ error}$ of a steering actuator, a failure probability value $P_{acc\ error}$ of a driving actuator, and/or a failure probability value $P_{brake\ error}$ of a braking actuator. In this connection, the steering actuator may include a steering device, the driving actuator may include an engine, a motor, and the like, and the braking actuator may include an anti lock brake system (ABS), an emergency braking system, a pneumatic braking device (an air brake system), and the like.

Figure 5:
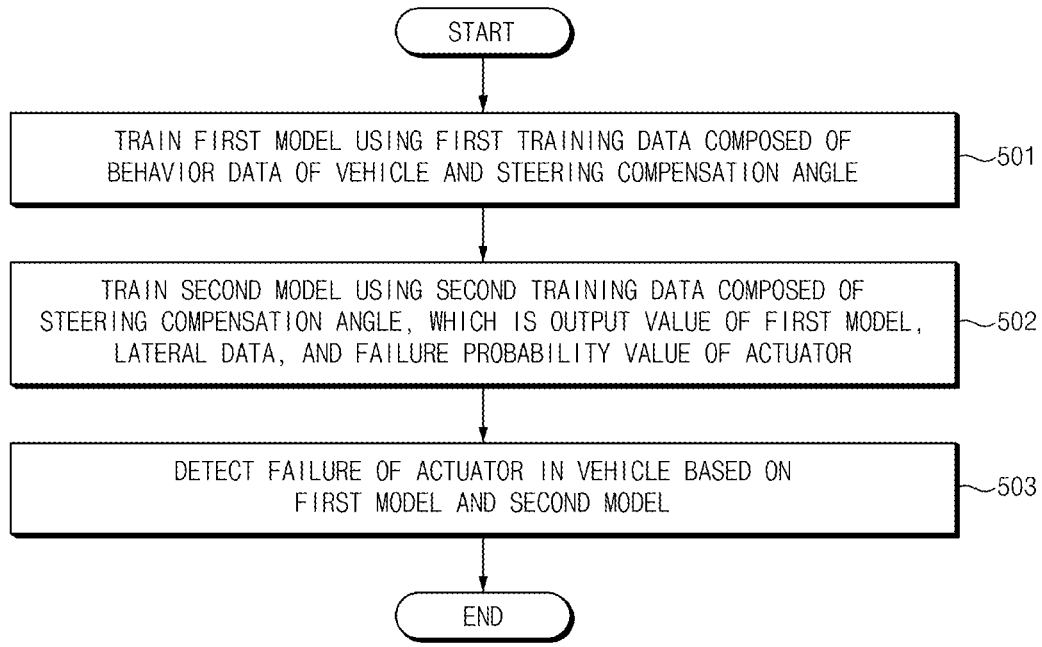
FIG. 5 is a flowchart for a method for detecting a failure of an actuator of a vehicle according to an embodiment of the present disclosure.

FIG. 5 is a flowchart for a method for detecting a failure of an actuator of a vehicle according to an embodiment of the present disclosure.

First, the training device 30 trains the first model using the first training data composed of the behavior data of the vehicle and the steering compensation angle (501).

Thereafter, the training device 30 trains the second model using the second training data composed of the steering compensation angle, which is the output value of the first model, the lateral data, and the failure probability value of the actuator (502).

Thereafter, the controller 40 detects the failure of the actuator in the vehicle based on the first model and the second model (503).

Figure 6:
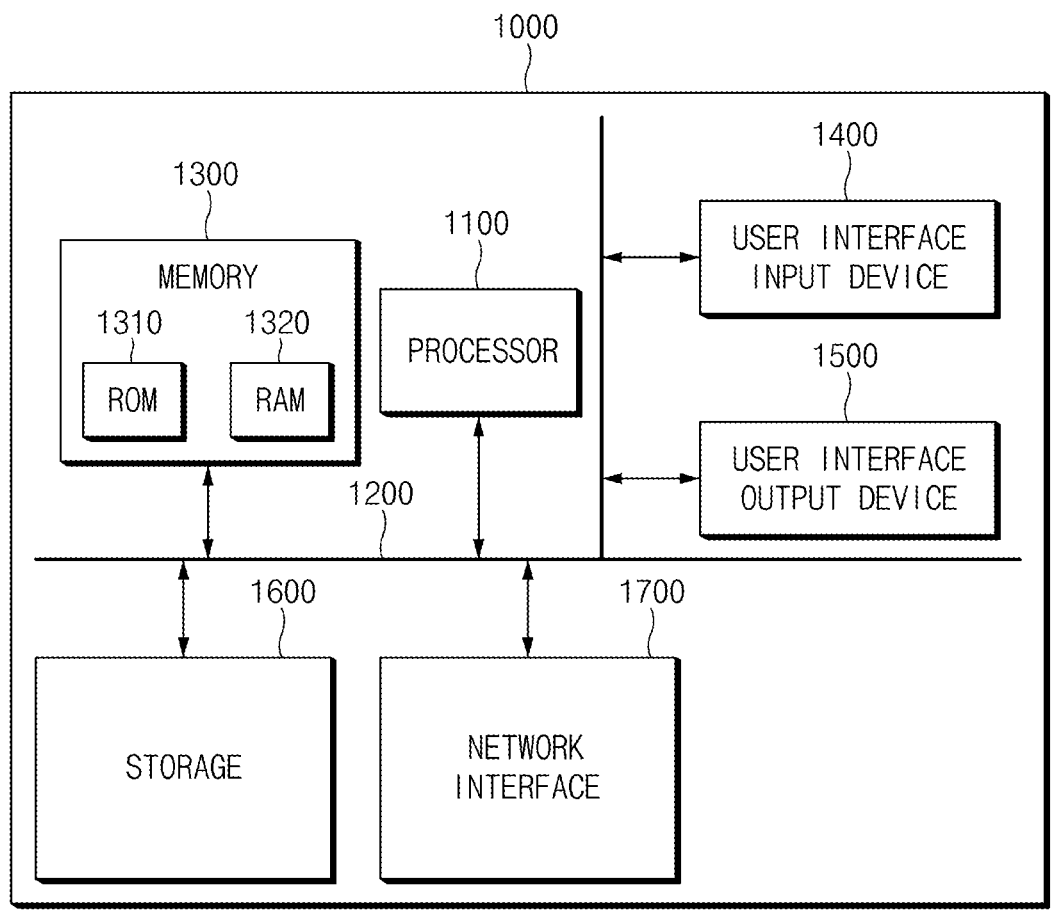
FIG. 6 is a block diagram illustrating a computing system for executing a method for detecting a failure of an actuator of a vehicle according to an embodiment of the present disclosure.

FIG. 6 is a block diagram illustrating a computing system for executing a method for detecting a failure of an actuator of a vehicle according to an embodiment of the present disclosure.

Referring to FIG. 6, the method for detecting the failure of the actuator of the vehicle according to an embodiment of the present disclosure described above may also be implemented through a computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state driver (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for detecting the failure of the actuator of the vehicle according to an embodiment of the present disclosure as described above may detect the failure of each actuator in the vehicle rapidly and accurately without the complicated calculation process by training the first model using the first training data composed of the behavior data of the vehicle and the steering compensation angle, training the second model using the second training data composed of the steering compensation angle, which is the output value of the first model, the lateral data, and the failure probability value of each actuator, and determining whether each actuator has failed based on the first model and the second model.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for detecting a failure of an actuator of a vehicle, the device comprising:
    a controller configured:
        to train a deep learning model using training data comprising a steering compensation angle, lateral data, and a failure probability value of the actuator; and
        to detect the failure of the actuator in the vehicle based on the deep learning model,
    wherein the deep learning model include an input layer that receives the steering compensation angle and the lateral data, a hidden layer that processes a linear combination of variable values transmitted from the input layer as a nonlinear function, and an output layer that outputs the failure probability value of the actuator of the vehicle as a result of processing of the hidden layer, and
    wherein, when the vehicle is an autonomous vehicle, the controller is configured to request the autonomous vehicle to perform redundancy travel when the failure of the actuator has occurred.

2. The device of claim 1, wherein the steering compensation angle is an output value of a preprocessing model which receives behavior data of the vehicle and outputs the steering compensation angle.

3. The device of claim 2, wherein the behavior data includes at least one of a steering angle of the vehicle, a longitudinal speed of the vehicle, or a longitudinal acceleration of the vehicle.

4. The device of claim 3, wherein the behavior data further includes a tractor yaw rate and a hitch angle.

5. The device of claim 1, wherein the lateral data includes at least one of a lateral acceleration of the vehicle or data on a lateral error on a travel route of the vehicle.

6. The device of claim 1, wherein the actuator includes at least one of a steering actuator, a driving actuator, or a braking actuator.

7. The device of claim 1, wherein the controller is configured to alert a driver when the failure of the actuator has occurred.

8. A method for detecting a failure of an actuator of a vehicle, the method comprising:
    training, by a controller, a deep learning model using training data comprising a steering compensation angle, lateral data, and a failure probability value of the actuator;
    detecting, by the controller, the failure of the actuator in the vehicle based on the deep learning mode; and
    when the vehicle is an autonomous vehicle, requesting, by the controller, the autonomous vehicle to perform redundancy travel upon detecting the failure of the actuator,
    wherein the deep learning model include an input layer that receives the steering compensation angle and the lateral data, a hidden layer that processes a linear combination of variable values transmitted from the input layer as a nonlinear function, and an output layer that outputs the failure probability value of the actuator of the vehicle as a result of processing of the hidden layer.

9. The method of claim 8, wherein the steering compensation angle is an output value of a preprocessing model which receives behavior data of the vehicle and outputs the steering compensation angle.

10. The method of claim 9, wherein the behavior data includes at least one of a steering angle of the vehicle, a longitudinal speed of the vehicle, or a longitudinal acceleration of the vehicle.

11. The method of claim 10, wherein the behavior data further includes a tractor yaw rate and a hitch angle.

12. The method of claim 8, wherein the lateral data includes at least one of a lateral acceleration of the vehicle or data on a lateral error on a travel route of the vehicle.

13. The method of claim 8, wherein the actuator includes at least one of a steering actuator, a driving actuator, or a braking actuator.

14. The method of claim 8, further comprising alerting, by the controller, a driver upon detecting the failure of the actuator.

* * * * *